United States Patent [19]

Deroche, Sr.

[11] Patent Number: 5,588,301
[45] Date of Patent: Dec. 31, 1996

[54] AIR SCOOP AND METHOD OF USE WITH ROOF MOUNTED VEHICLE AIR CONDITIONER

[76] Inventor: Gerald J. Deroche, Sr., 231 Saint Anthony St., Luling, La. 70070

[21] Appl. No.: 506,399

[22] Filed: Jul. 24, 1995

[51] Int. Cl.$^6$ .................................... B60H 1/32
[52] U.S. Cl. .................. 62/61; 62/244; 62/428; 62/452; 62/DIG. 16
[58] Field of Search .............. 62/61, 244, 428, 62/452, DIG. 16; 454/86, 98, 107, 128, 130, 136, 137, 138

[56] References Cited

U.S. PATENT DOCUMENTS

| | | | |
|---|---|---|---|
| 953,350 | 3/1910 | Schrader | 454/98 |
| 2,162,512 | 6/1939 | McPherson et al. | 62/244 X |
| 2,443,472 | 6/1948 | Mayo et al. | 62/DIG. 16 X |
| 2,576,549 | 11/1951 | Wagner et al. | 62/DIG. 16 X |
| 3,059,562 | 10/1962 | Sturtevant et al. | 454/130 |
| 3,315,488 | 4/1967 | Lind | 62/61 X |
| 3,628,348 | 12/1971 | Dixon | 62/244 X |
| 3,724,232 | 4/1973 | Dixon et al. | 62/244 |
| 4,111,106 | 9/1978 | Burns . | |
| 4,490,989 | 1/1985 | Keen | 62/243 |
| 4,494,384 | 1/1985 | Lott | 62/279 |
| 4,724,748 | 2/1988 | Geyer | 454/137 X |
| 5,005,372 | 4/1991 | King | 62/244 |
| 5,184,474 | 2/1993 | Ferdows | 62/244 |
| 5,220,808 | 6/1993 | Mayer | 62/244 |
| 5,355,693 | 10/1994 | McConnell et al. | 62/428 X |

FOREIGN PATENT DOCUMENTS 586676  4/1925  France ................... 454/130

*Primary Examiner*—Harold Joyce
*Attorney, Agent, or Firm*—Joseph N. Breaux

[57] ABSTRACT

An air scoop and method of use for increasing the cooling effectiveness of roof mounted air conditioners. The air scoop has a substantially rectangular shaped air inlet aperture in connection with a rectangular cross-sectional shaped conduit having a substantially ninety degree bend therein that is in connection with a substantially rectangular shaped air discharge outlet aperture; an air directing lip member extending away from a first geometric plane defined by the discharge outlet aperture at an angle of between ten and eighty (10°, 80°) degrees; and a pair of mounting brackets, extending away from a seconded geometric plane defined by the air inlet aperture at an angle of about ninety (90°) degrees, each mounting bracket including a fastening aperture adjacent a distal end thereof.

4 Claims, 5 Drawing Sheets

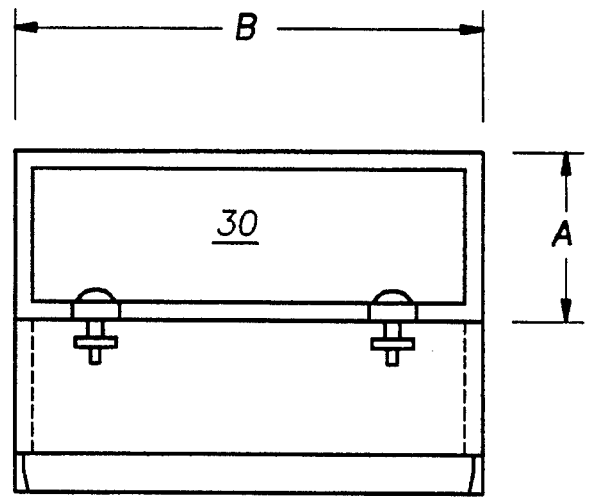
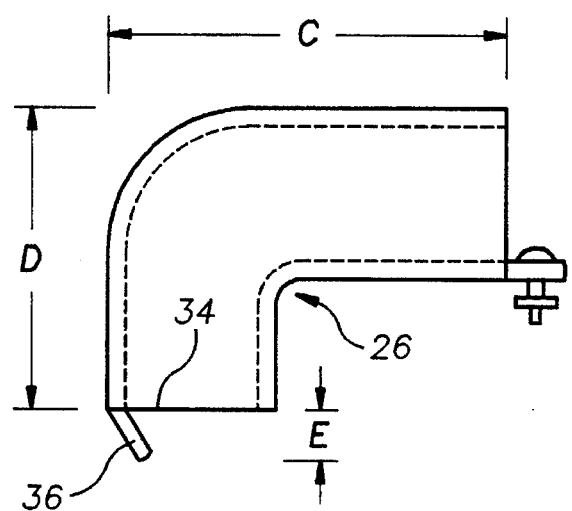
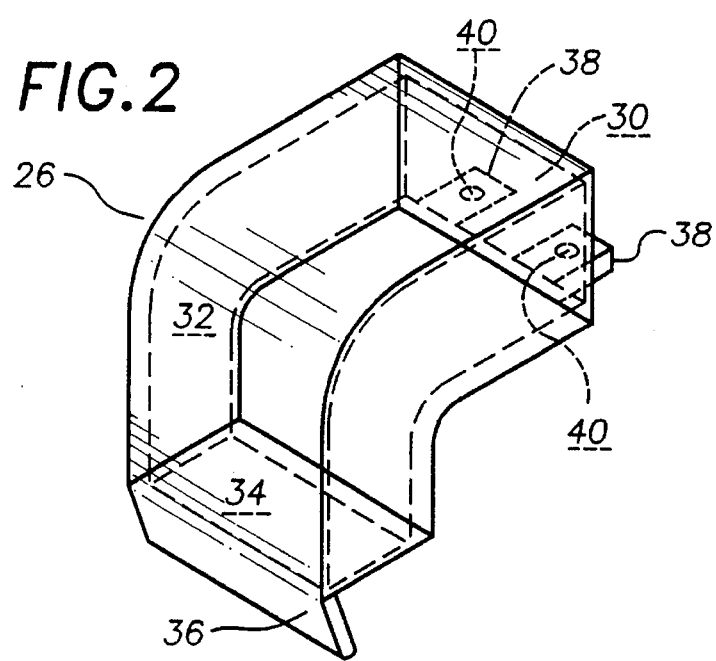

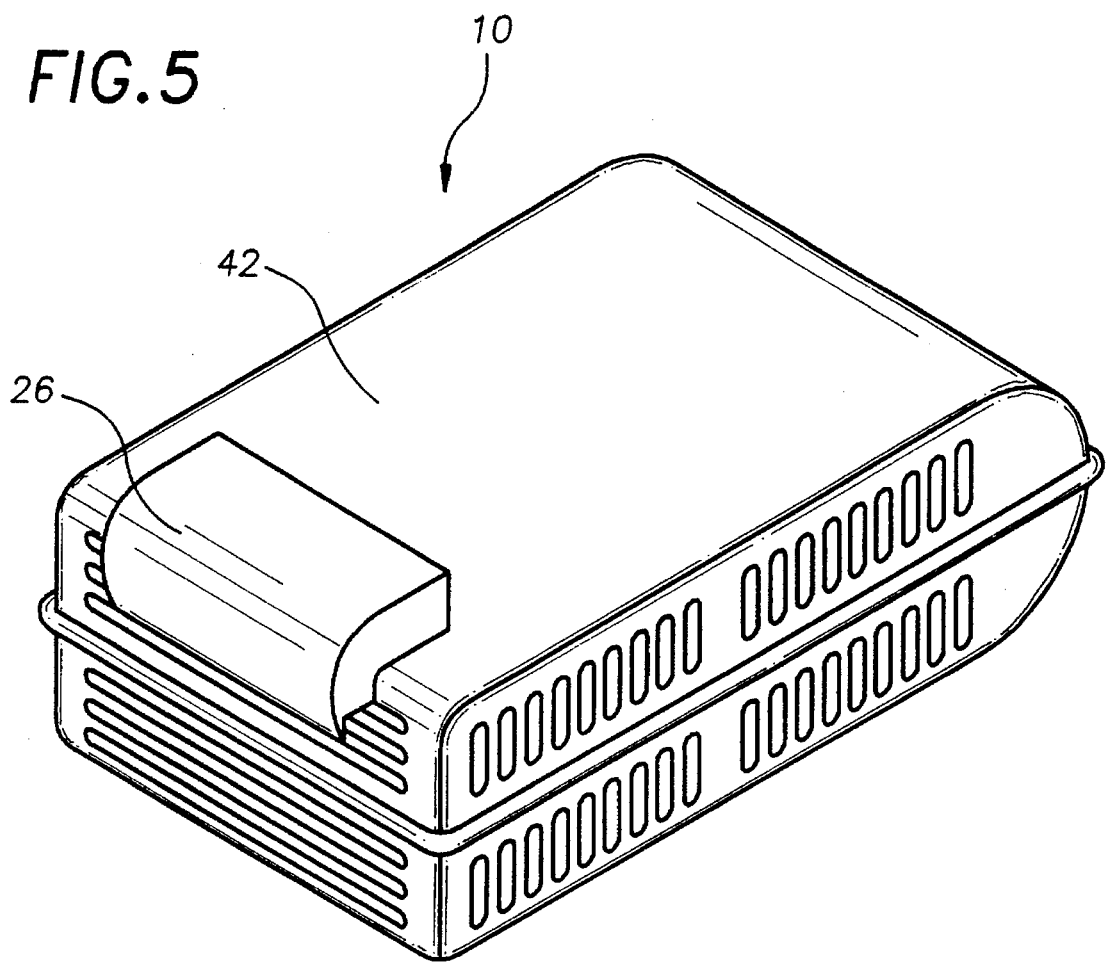

AIR SCOOP AND METHOD OF USE WITH ROOF MOUNTED VEHICLE AIR CONDITIONER

TECHNICAL FIELD

The present invention relates to devices and methods for increasing the cooling effect of a roof mounted air conditioner for a vehicle and more particularly to devices and methods for increasing the air flow through the condenser section of roof mounted air conditioners of the type that have a condenser air intake that is oriented or directed toward the rear of the vehicle to which the air conditioner is mounted.

BACKGROUND ART

Large recreational vehicles often require one or more high capacity roof mounted air conditioners in order to maintain the interior space of the R.V. at comfortable temperatures for the occupants. The present invention is directed toward increasing the cooling effect of roof mounted air conditioners of the type used on R.V.'s that have the condenser air intake oriented or directed toward the rear of the R.V. The inventor hereof has noticed that air conditioners of this type have a marked decrease in cooling effect during periods during in which the R.V. is traveling at speeds in excess of thirty (30 mph) miles per hour. Because of this marked decrease in cooling effect when traveling at speeds in excess of thirty miles per hour in hot climates, it is necessary to either make stops along the way to allow the air conditioner to lower the temperature within the R.V. or to run a second roof mounted air conditioner unit. It would be a benefit, therefore, to have a device for increasing the cooling effect of roof mounted air conditioners of the type used on R.V.'s that have the condenser air intake oriented or directed toward the rear of the R.V. while traveling at speeds in excess of thirty miles per hour without reducing the cooling effect of the unit while parked or traveling at speeds below thirty miles per hour. It would be a further benefit if the device were easily installed on existing roof mounted air conditioner units and did not require special training and/or specialized equipment to make the installation. It would be a still further benefit if the device were inexpensive to operate and maintain.

General Summary Discussion Of Invention

It is thus an object of the invention to provide a device for increasing the cooling effect of roof mounted air conditioners of the type used on R.V.'s that have the condenser air intake oriented or directed toward the rear of the R.V. while traveling at speeds in excess of thirty miles per hour without reducing the cooling effect of the unit while parked or traveling at speeds below thirty miles per hour.

It is a further object of the invention to provide a device for increasing the cooling effect of roof mounted air conditioners of the type used on R.V.'s that have the condenser air intake oriented or directed toward the rear of the R.V. that is easily installed on existing roof mounted air conditioner units without special training and/or specialized equipment.

It is a still further object of the invention to provide a device for increasing the cooling effect of roof mounted air conditioners of the type used on R.V.'s that have the condenser air intake oriented or directed toward the rear of the R.V. that is inexpensive to operate and maintain.

It is a still further object of the invention to provide a method for increasing the cooling effect of roof mounted air conditioners of the type used on R.V.'s that have the condenser air intake oriented or directed toward the rear of the R.V. that utilizes movement of the R.V. to increase air flow through the condenser air intake of the roof mounted air conditioner.

It is a still further object of the invention to provide a device for increasing the cooling effect of roof mounted air conditioners of the type used on R.V.'s that have the condenser air intake oriented or directed toward the rear of the R.V. that accomplishes all or some of the above objects in combination.

Accordingly, a device for increasing the cooling effect of roof mounted air conditioners of the type used on R.V.'s that have the condenser air intake oriented or directed toward the rear of the R.V. is provided. The device comprises an air scoop member having a substantially rectangular shaped air inlet aperture in connection with a rectangular cross-sectional shaped conduit having a substantially ninety degree bend therein that is in connection with a substantially rectangular shaped air discharge outlet aperture; an air directing lip member extending away from a first geometric plane defined by the discharge outlet aperture at an angle of between ten and eighty (10°, 80°) degrees; and a pair of mounting brackets, extending away from a second geometric plane defined by the air inlet aperture at an angle of about ninety (90°) degrees, each mounting bracket including a fastening aperture adjacent a distal end thereof.

The rectangular shaped inlet aperture is preferably between one and three inches in height and about as long as the condenser air intake of the roof mounted air conditioning unit with which it is to be used. The air directing lip is preferably the same length as the discharge outlet aperture and extends away from the first geometric plane a distance between one and three inches.

It is also desirable, in some cases, to provide a quantity of vibration absorbing material over a portion of the exterior surface of the scoop member to reduce noise generated by vibrational contact between the exterior of the air condition unit and the scoop member. When the vibration absorbing material is included, it preferably covers two L-shaped portions of the exterior surface of the scoop member.

In another aspect of the invention a method of increasing the cooling effect of roof mounted air conditioners of the type used on R.V.'s that have the condenser air intake oriented or directed toward the rear of the R.V. is provided. The method includes the steps of 1) providing a scoop member having an inlet and an outlet aperture connected via a conduit having between a seventy and a one-hundred-ten (70°, 110°) degree bend therein between the inlet and outlet aperture and the length of the outlet aperture is selected to have a length measuring between seventy and one-hundred-twenty (70%, 120%) percent of the length of the condenser air intake; 2) securing the scoop member to the air conditioner in a manner such that the inlet aperture of the scoop is directed toward the front of the vehicle to which the air conditioner is attached and the outlet aperture is directed toward the condenser air intake. The scoop member is preferably secured to the air conditioner in a manner such that the conduit connecting the inlet and the outlet apertures does not block passage of air through the condenser air intake. It is also preferable to orient the plane defined by the outlet aperture at between a seventy and a one-hundred-ten (70°, 110°) degree angle to the plane of the condenser air intake.

The scoop member provided preferably includes a substantially rectangular shaped air inlet aperture in connection with a rectangular cross-sectional shaped conduit that is in connection with a substantially rectangular shaped air discharge outlet aperture. It is also preferable to provide a scoop member having an air directing lip member extending away from a first geometric plane defined by the discharge outlet aperture at an angle of between ten and eighty degrees.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a perspective view of an embodiment of the scoop member of the present invention.

FIG. 3 is a front view of the scoop member of FIG. 1 showing the rectangular inlet aperture, the two mounting brackets, and the air directing lip member running the length of the air discharge outlet aperture.

FIG. 4 is a side view of the scoop member of FIG. 2 showing the air directing lip member extending away from the plane defined by the air discharge outlet aperture at about a forty-five degree angle.

FIG. 5 is a perspective view of the scoop member of FIG. 2 secured in place to the representative air conditioning unit of FIG. 1.

EXEMPLARY MODE FOR CARRYING OUT THE INVENTION

Figure 1:
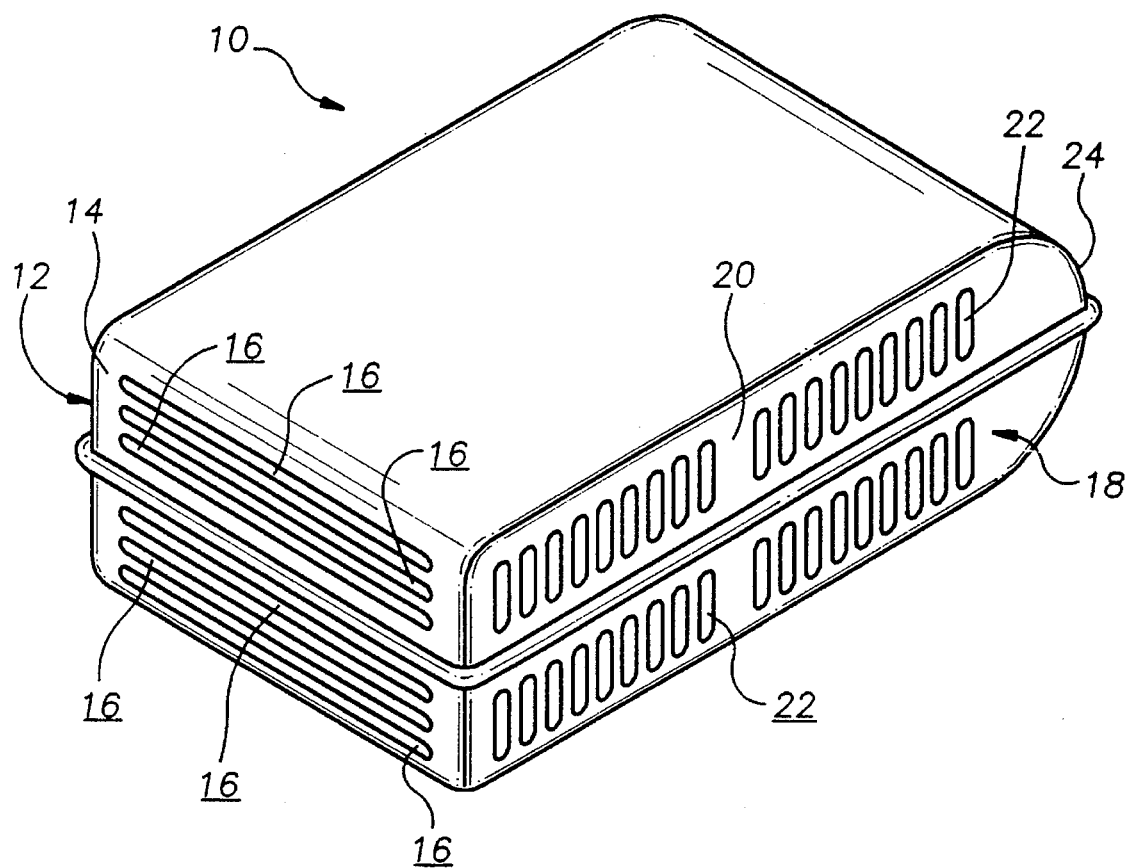
FIG. 1 is a perspective view of a representative air conditioner of the type with which the scoop member and method of the present invention are utilized.
Figure 6:
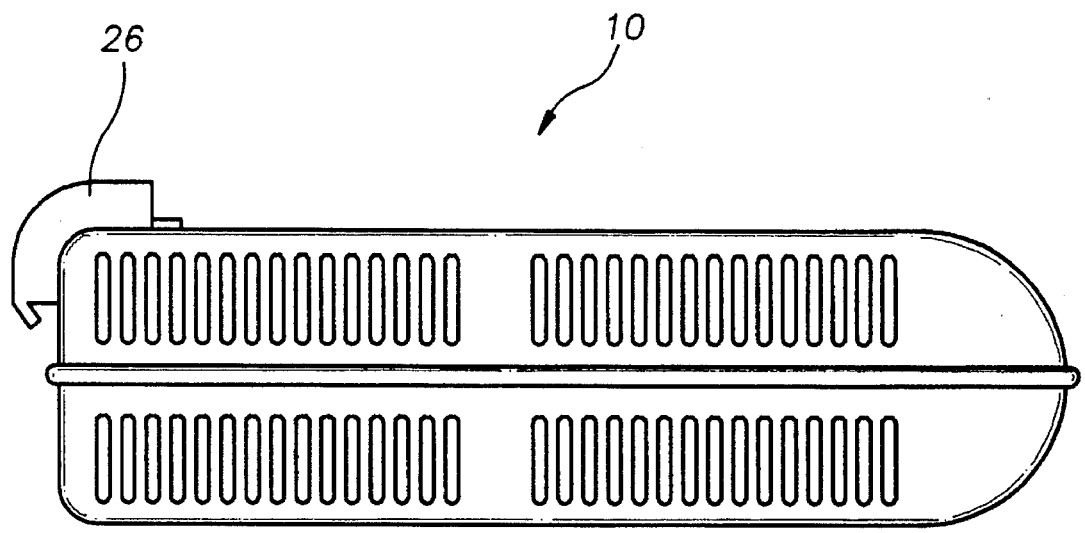
FIG. 6 is a side view of the scoop member of FIG. 2 secured in place to the representative air conditioning unit of FIG. 1.
Figure 7:
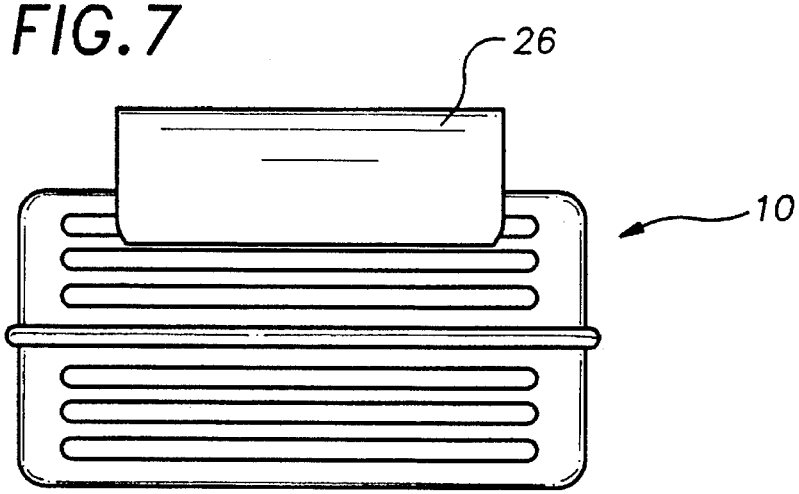
FIG. 7 is a rear view of the scoop member of FIG. 2 secured in place to the representative air conditioning unit of FIG. 1.

FIG. 1 is a perspective view of a representative roof mounted air conditioner, generally referenced by the numeral 10, of the type with which the scoop member and method of the present invention are utilized. As shown in the figure, roof mounted air conditioner 10 has a condenser air intake, generally referenced by the numeral 12, that is located on the rear sidewall 14 of air conditioner 10 and includes a plurality of air intake apertures 16. Air conditioner 10 also includes a first and second air exhaust outlet, generally referenced by the numeral 18, that are located on the two side sidewalls 20 (only one shown) of air conditioner 10 that are adjacent rear sidewall 14. Air exhaust outlets 18 include a plurality of air exhaust apertures 22. During installation of air conditioner 10, a contoured front end 24 of air conditioner 10 is oriented toward the front of the vehicle and air conditioner 10 secured in place in a manner such that air conditioner 10 travels through the air with front end 24 preceding rear sidewall 14.

FIG. 2 is a perspective view of an exemplary embodiment of the air scoop of the present invention generally referenced by the numeral 26. Air scoop 26 is constructed of molded plastic and includes a substantially rectangular shaped air inlet aperture 30 in connection with a rectangular cross-sectional shaped conduit 32 having a substantially ninety degree bend therein that is in connection with a substantially rectangular shaped air discharge outlet aperture 34; an air directing lip member 36 extending away from a first geometric plane defined by discharge outlet aperture 34 at an angle of about forty-five (45°) degrees; and a pair of mounting brackets 38, extending away from a second geometric plane defined by air inlet aperture 30 at an angle of about ninety (90°) degrees, each mounting bracket 38 including a fastening aperture 40 adjacent a distal end thereof.

With reference to FIG. 3, rectangular shaped inlet aperture 30 is about two and one-half (2½") inches in height "A" and about twenty-two and one-half (22½") inches in width "B". In this embodiment, discharge outlet aperture 34 has the same dimensions.

With reference to FIG. 4, scoop member 26 has an overall length in the direction indicated by the Letter "C" of about six (6") inches and an overall height in the direction indicated by the Letter "D" of about six (6") inches. As shown in the figure, air directing lip member 36 extends away from the geometric plane defined by discharge outlet aperture 34 a distance "E" of about one (1") inch.

Use of scoop member 26 will now be described in conjunction with an exemplary embodiment of the method of the invention with general reference to FIGS. 1–7. In this exemplary embodiment, the method includes the steps of 1) providing a scoop member 26 as described herein previously above; 2) bolting scoop member 26 to a roof portion 42 of air conditioner 10 in a manner such that inlet aperture 30 of scoop member 26 is directed toward the front of the vehicle to which air conditioner 10 is attached, outlet aperture 34 is directed toward condenser air intake 12, and the passage of air through condenser air intake 12 is not blocked by any portion of scoop member 26; and 3) utilizing air conditioner 10 in the usual manner after steps 1 and 2 have been accomplished.

As scoop member 26 travels through the air, air is channeled from roof 42 through scoop member 26, out through discharge outlet aperture 34 and directed at least partially by lip member 36 into condenser air intake 12. Varying the length and angular orientation of directing lip member 36 can change the quantity of air directed through condenser air intake 12. The increased flow of air through condenser air intake 12 allows the condenser unit of air conditioner 10 to perform more efficiently and, thereby, provide more cooling effect to the interior of the vehicle to which air conditioner 10 is installed. The installation of scoop member 26 to air conditioner 10 causes very little additional drag on the vehicle and, because scoop member 26 does not block condenser air intake 12, air conditioner 10 operates while parked or traveling at slow speeds in the same manner as before installation of scoop member 26.

Figure 8:
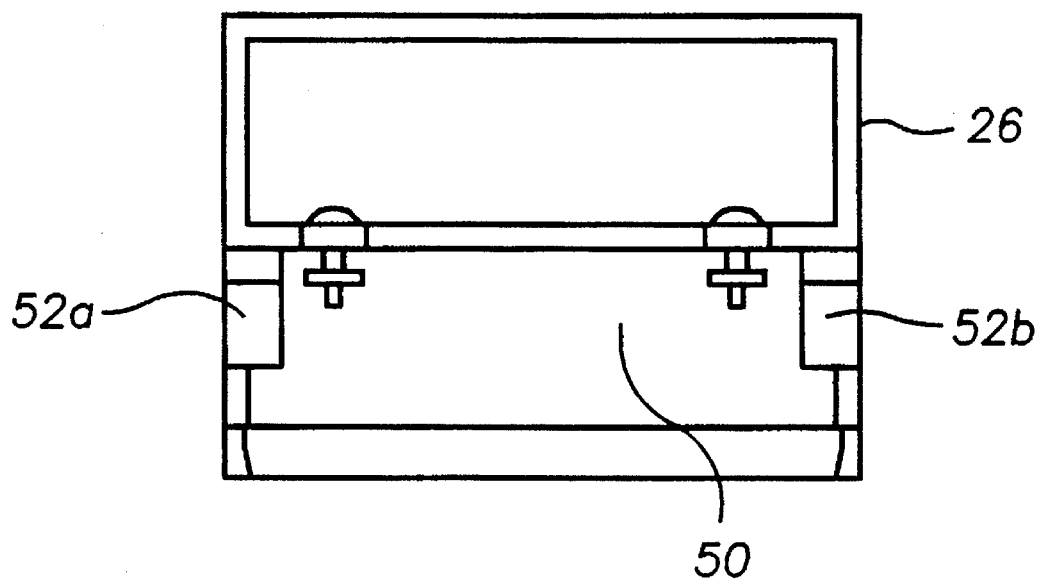
FIG. 8 is a front view of the scoop member of FIG. 3 showing a pair of optional vibration reducing foam gaskets secured to the outer surface of the scoop member.
Figure 9:
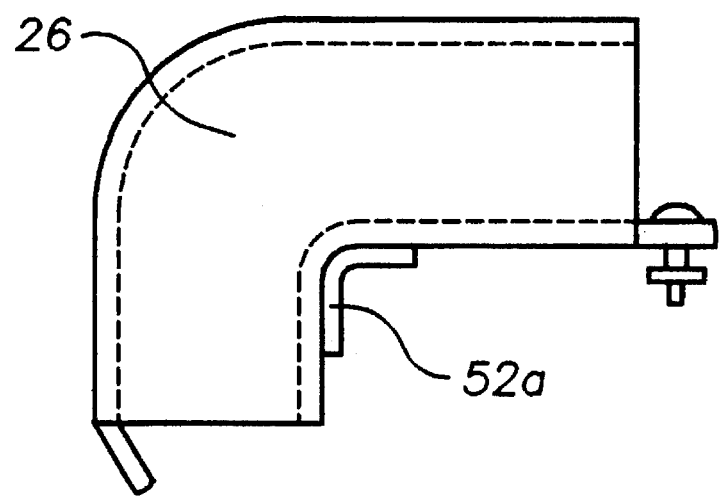
FIG. 9 is a side view of the scoop member of FIG. 8 showing one of the optional vibration reducing foam gaskets secured to the outer surface of the scoop member.

If after installation, vibration generated noises are created by contact between of scoop member 26 and air conditioner 10 an identical pair of optional, vibration damping, foam gaskets 52a,52b may be secured to the exterior surface 50 of scoop member 26 as illustrated in FIG. 8. Scoop member 26 may also be constructed and sold with gaskets 52a,52b already secured in position if desired. Also shown in FIG. 8 is a second embodiment of scoop member 26 in which interior wall 50 adjacent air-conditioning unit 10 is not included. The exterior cabinet of air-conditioning unit 10 is utilized in place of interior wall 50 to channel airflow to the air conditioner. FIG. 9 shows the L-shaped side profile of gasket 52a secured in place on scoop member 26.

It can be seen from the preceding description that a scoop member and method of using the same that increase the cooling effect of roof mounted air conditioners of the type used on R.V.'s while traveling at speeds in excess of thirty miles per hour without reducing the cooling effect of the unit while parked or traveling at speeds below thirty miles per hour; that may be practiced without the need for specialized training and/or specialized equipment; and that are inexpensive to use and practice have been provided.

It is noted that the embodiment of the air scoop and method of use with a roof mounted vehicle air conditioner described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of increasing the cooling effect of roof mounted air conditioners of the type having a condenser air intake located on a rear sidewall of said air conditioner, said method comprising the steps of:

1) providing a scoop member having an inlet and an outlet aperture connected via a conduit having between a seventy and a one-hundred-ten degree bend therein, said outlet aperture having a length measuring between seventy and one-hundred-twenty percent of a length of said condenser air intake; and 2) securing said scoop member to said air conditioner in a manner such that said inlet aperture of said scoop member is directed toward a front of said air conditioner and said outlet aperture is directed toward said condenser air intake.

2. The method of claim 1 wherein:

said scoop member provided further includes: an air directing lip member extending away from a first geometric plane defined by said discharge outlet aperture at an angle of between ten and eighty degrees.

3. The method of claim 2, wherein:

said air directing lip member has a length substantially equal to a length of said discharge outlet aperture and extends away from said first geometric plane a distance between one and three inches.

4. The method of claim 1 wherein:

said scoop member provided includes a substantially rectangular shaped air inlet aperture, a substantially rectangular shaped air discharge outlet aperture, and said conduit has a substantially rectangular cross-sectional shape.

* * * * *